(12) United States Patent
Kong et al.

(10) Patent No.: US 12,479,433 B2
(45) Date of Patent: Nov. 25, 2025

(54) VEHICLE CONTROL APPARATUS FOR CONTROLLING REVERSE DRIVING OF A VEHICLE CONNECTED TO A TRAILER AND METHOD THEREOF

(71) Applicants: Hyundai Motor Company, Seoul (KR); Kia Corporation, Seoul (KR)

(72) Inventors: Do Hyun Kong, Gwangmyeong-Si (KR); Min Sang Seong, Yongin-Si (KR)

(*) Notice: Subject to any disclaimer, the term of this patent is extended or adjusted under 35 U.S.C. 154(b) by 83 days.

(21) Appl. No.: 18/508,723

(22) Filed: Nov. 14, 2023

(65) Prior Publication Data

US 2025/0002018 A1 Jan. 2, 2025

(30) Foreign Application Priority Data

Jun. 28, 2023 (KR) .................. 10-2023-0083580

(51) Int. Cl.
| | |
|---|---|
| *B62D 6/00* | (2006.01) |
| *B60R 1/072* | (2006.01) |
| *B60R 1/26* | (2022.01) |
| *B60W 10/20* | (2006.01) |
| *B60W 10/30* | (2006.01) |

(Continued)

(52) U.S. Cl.
CPC ....... *B60W 30/18036* (2013.01); *B60R 1/072* (2013.01); *B60R 1/26* (2022.01); *B60W 10/20* (2013.01); *B60W 10/30* (2013.01); *H04N 5/272* (2013.01); *H04N 7/181* (2013.01); *B60R 2300/304* (2013.01); *B60W 2420/403* (2013.01);

(Continued)

(58) Field of Classification Search
CPC .. B62D 13/06; B62D 15/027; B62D 15/0285; B62D 15/0275; B62D 6/00; B60W 30/18036; B60W 10/20; B60W 10/30; B60W 2420/403; B60W 2710/20; B60W 2710/30; B60R 1/26; B60R 1/072; B60R 2300/304; H04N 5/272; H04N 7/181
See application file for complete search history.

(56) References Cited

U.S. PATENT DOCUMENTS 8,930,140 B2 * 1/2015 Trombley ............ B62D 15/027
701/28
9,233,710 B2 * 1/2016 Lavoie .................. B62D 13/06
(Continued)

OTHER PUBLICATIONS

Volkswagen Ireland "Technical Video for Trailer Assist," retrieved from: https://www.youtube.com/watch?v=bF1AQtipXP4.

*Primary Examiner* — Gonzalo Laguarda
(74) *Attorney, Agent, or Firm* — Banner & Witcoff, Ltd.

(57) ABSTRACT

An apparatus for controlling a vehicle includes a processor, a display, a camera configured to obtain an image of the vehicle, a side mirror controller configured to control a side mirror of the vehicle, and a steering controller configured to control steering of the vehicle, wherein the processor is configured to: display, an image of the vehicle, a first line object indicating a drawbar, wherein the drawbar connects to the vehicle via a coupler, and a second line object associated with steering of the vehicle, based on an input to the side mirror controller, rotate the second line object around one of two endpoints of the second line object, wherein the one of two endpoints and the coupler are superimposed on each other, and control, based on the rotated second line object, the steering such that the first line object and the second line object are superimposed on each other.

20 Claims, 6 Drawing Sheets

(51) Int. Cl.
 *B60W 30/18* (2012.01)
 *H04N 5/272* (2006.01)
 *H04N 7/18* (2006.01)

(52) U.S. Cl.
 CPC ..... *B60W 2710/20* (2013.01); *B60W 2710/30* (2013.01); *B62D 6/00* (2013.01)

(56) References Cited

U.S. PATENT DOCUMENTS

| | | | |
|---|---|---|---|
| 9,283,892 B2* | 3/2016 | Trombley | B62D 15/027 |
| 9,296,421 B2* | 3/2016 | Lavoie | G06F 3/017 |
| 9,708,000 B2* | 7/2017 | Hafner | B62D 15/0275 |
| 10,632,919 B2* | 4/2020 | Ling | B60R 1/26 |
| 11,577,782 B2 | 2/2023 | Goodarzi et al. | |
| 2023/0365134 A1* | 11/2023 | Joseph | B60W 10/20 |

\* cited by examiner

VEHICLE CONTROL APPARATUS FOR CONTROLLING REVERSE DRIVING OF A VEHICLE CONNECTED TO A TRAILER AND METHOD THEREOF

CROSS-REFERENCE TO RELATED APPLICATION

This application claims the benefit of priority to Korean Patent Application No. 10-2023-0083580, filed in the Korean Intellectual Property Office on Jun. 28, 2023, the entire contents of which are incorporated herein by reference.

TECHNICAL FIELD

The present disclosure relates to a vehicle control apparatus and a method thereof, and more particularly, relates to technologies associated with a function for assisting with reverse driving.

BACKGROUND

If a vehicle backs up, various functions for assisting with reverse driving may be provided for the convenience of a user.

For example, a smart assist system may be a system for searching for a space where a vehicle will back up using an ultrasonic sensor and a smart wheel sensor and generating a driving route up to a location where the driving is ended to control steering, which may be a system for controlling a vehicle to automatically back up with only forward and reverse control and brake manipulation without manipulation of the steering wheel of a driver.

Particularly, if a vehicle connected with a trailer backs up, because the vehicle backs up in the state where the trailer and the vehicle are connected with each other, users who are inexperienced in driving the vehicle connected with the trailer may have difficulties.

SUMMARY

According to the present disclosure, an apparatus for controlling a vehicle, the apparatus may comprise: a processor; a display; a camera configured to obtain an image of the vehicle; a side mirror controller configured to control a side mirror of the vehicle; and a steering controller configured to control steering of the vehicle, wherein the processor is configured to: based on activating an assisted reverse driving of the vehicle, cause the camera to obtain an image of the vehicle being connected with a trailer; display, on the display: the obtained image; a first line object indicating a drawbar, wherein the drawbar extends from the trailer and connects to the vehicle via a coupler; and a second line object associated with steering of the vehicle; based on an input to the side mirror controller, rotate the second line object around one of two endpoints of the second line object, wherein the one of two endpoints and the coupler are superimposed on each other; and control, based on the rotated second line object, the steering such that the first line object and the second line object are superimposed on each other.

The apparatus, wherein the processor is configured to: rotate the second line object around the one of two endpoints at a first angle, based on the input to the side mirror controller for a first time period, by a number corresponding to the input; and based on a continuous input to the side mirror controller for a second time period that is longer than the first time period, after the second time period and until an end time of the continuous input, rotate the second line object around the one of two endpoints.

The apparatus, may further comprise: a switch configured to select one of a plurality of side mirrors including the side mirror, wherein the processor is configured to: rotate the second line object around the one of two endpoints, based on the input to the side mirror controller, in a state where one of the plurality of side mirrors is not selected by the switch.

The apparatus, wherein the processor is configured to: change the second line object to a reference location displayed on the display, based on an input, for rotating the second line object, to one of buttons of the side mirror controller.

The apparatus, wherein the processor is configured to: display, on the display, by superimposing the obtained image on a range of angles within which the second line object is rotatable.

The apparatus, wherein the processor is configured to: identify an angle between a segment and the second line object, the segment connecting a center of a third periphery of the obtained image and a center of a second periphery of the obtained image, wherein the third periphery faces the second periphery, which is longer than a first periphery of the obtained image; rotate the second line object around the one of two endpoints such that the angle corresponds to a maximum value of a range, based on the angle being greater than the range; and rotate the second line object around the one of two endpoints such that the angle corresponds to a minimum value of the range, based on the angle being less than the range, and wherein the range of the angle includes: a positive number in a clockwise direction with respect the segment; and a negative number in a counterclockwise direction with respect to the segment.

The apparatus, wherein the processor is configured to: identify an angle between a segment and the second line object, the segment connecting a center of a third periphery of the obtained image and a center of a second periphery of the obtained image, wherein the third periphery faces the second periphery, which is longer than a first periphery of the obtained image; rotate the second line object around the one of two endpoints by a second angle, based on an absolute value of the angle being less than a reference value; and rotate the second line object around the one of two endpoints by a third angle greater than the second angle, based on the absolute value of the angle being greater than or equal to the reference value.

The apparatus may further comprise: a plurality of cameras including the camera, wherein the processor is configured to: display, on the display and based on images obtained by the plurality of cameras, at least one of a top-view image or a round-view image; and control the steering such that the first line object and the second line object are superimposed on each other, based on rotating the second line object around the one of two endpoints, while the at least one of the top-view image or the round-view image is displayed.

The apparatus, wherein the processor is configured to: identify a gesture input to the side mirror controller; rotate the second line object around the one of two endpoints in a direction corresponding to a first direction, based on identifying a first gesture input including the first direction; and change the second line object to a reference location displayed on the display, based on identifying a second gesture input including a second direction perpendicular to the first direction.

The apparatus, wherein the processor is configured to: display by superimposing the first line object and the second line object, based on identifying, in the obtained image, at least one of the coupler, the drawbar, or a combination of the coupler and the drawbar and based on activating an assisted reverse driving of the vehicle.

According to the present disclosure, a method for controlling a vehicle, the method may comprise: obtaining an image of the vehicle being connected with a trailer, based on activating an assisted reverse driving of the vehicle; displaying on a display: the obtained image; a first line object indicating a drawbar, wherein the drawbar extends from the trailer and connects to the vehicle via a coupler; and a second line object associated with steering of the vehicle; based on an input to a side mirror controller for controlling a side mirror of the vehicle, rotating the second line object around one of two endpoints of the second line object, wherein the one of two endpoints and the coupler are superimposed on each other; and controlling, based on the rotated second line object, the steering such that the first line object and the second line object are superimposed on each other.

The method may further comprise: rotating the second line object around the one of two endpoints at a first angle, based on the input to the side mirror controller for a first time period, by a number corresponding to the input; and based on a continuous input to the side mirror controller for a second time period that is longer than the first time period, after the second time period and until an end time of the continuous input, rotating the second line object around the one of two endpoints.

The method may further comprise: rotating the second line object around the one of two endpoints, based on the input to the side mirror controller, in a state where one of a plurality of side mirrors including the side mirror is not selected.

The method may further comprise: changing the second line object to a reference location displayed on the display, based on an input, for rotating the second line object, to one of buttons of the side mirror controller.

The method may further comprise: displaying, on the display, the obtained image superimposed on a range of angles within which the second line object is rotatable.

The method may further comprise: identifying an angle between a segment and the second line object, the segment connecting the center of a third periphery of the obtained image and a center of a second periphery of the obtained image, wherein the third periphery faces the second periphery, which is longer than a first periphery of the obtained image; rotating the second line object around the one of two endpoints such that the angle corresponds to: a maximum value of a range, based on the angle being greater than the range; or a minimum value of the range, based on the angle being less than the range, wherein the range of the angle includes: a positive number in a clockwise direction with respect the segment; and a negative number in a counterclockwise direction with respect to the segment.

The method may further comprise: identifying an angle between a segment and the second line object, the segment connecting a center of a third periphery of the obtained image and a center of a second periphery of the obtained image, wherein the third periphery faces the second periphery, which is longer than a first periphery of the obtained image; and rotating the second line object around the one of two endpoints by: a second angle, based on an absolute value of the angle being less than a reference value; or a third angle greater than the second angle, based on the absolute value of the angle being greater than or equal to the reference value.

The method may further comprise: displaying, on the display and based on images obtained by a plurality of cameras, at least one of a top-view image or a round-view image; and controlling the steering such that the first line object and the second line object are superimposed on each other, based on rotating the second line object around the one of two endpoints, while the at least one of the top-view image or the round-view image is displayed.

The method may further comprise: identifying a gesture input to the side mirror controller; rotating the second line object around the one of two endpoints in a direction corresponding to a first direction, based on identifying a first gesture input including the first direction; and changing the second line object to a reference location displayed on the display, based on identifying a second gesture input including a second direction perpendicular to the first direction.

The method may further comprise: displaying the first line object and the second line object at least partially superimposed on the first line object based on identifying, in the obtained image, at least one of the coupler, the drawbar, or a combination of the coupler and the drawbar and based on activating an assisted reverse driving of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
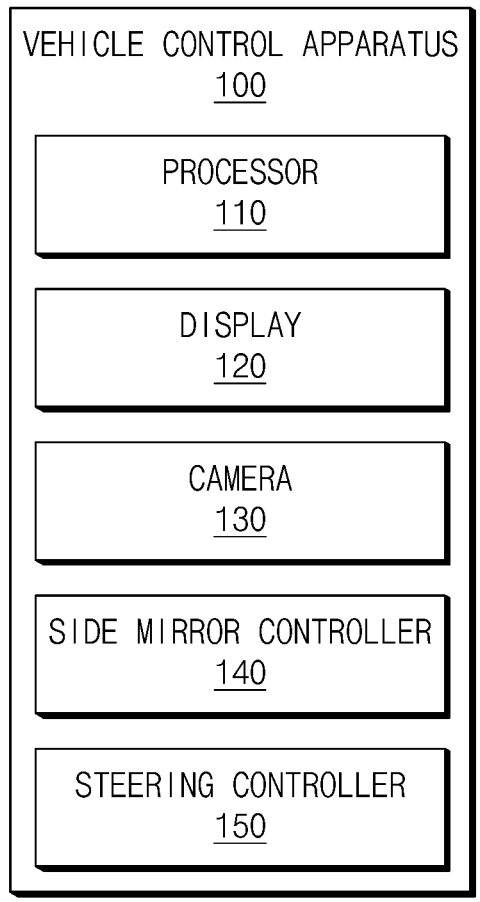
FIG. 1 shows an example of a block diagram of a vehicle control apparatus according to an example of the present disclosure.

Hereinafter, some examples of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of examples of the present disclosure, the terms first, second, A, B, (a), (b), and the like may be used herein. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of this disclosure and the relevant art and will not be interpreted in an idealized or overly formal sense unless expressly so defined herein.

Hereinafter, examples of the present disclosure will be described in detail with reference to FIGS. 1 to 6.

FIG. 1 shows an example of a block diagram of a vehicle control apparatus according to an example of the present disclosure.

Referring to FIG. 1, a vehicle control apparatus 100 according to an example of the present disclosure may be implemented inside or outside a vehicle, and some of components included in the vehicle control apparatus 100 may be implemented inside or outside the vehicle. In this case, the vehicle control apparatus 100 may be integrally configured with control units in the vehicle or may be implemented as a separate device to be connected with the control units of the vehicle by a separate connection means. For example, the vehicle control apparatus 100 may further include components which are not shown in FIG. 1.

According to an example, the vehicle control apparatus 100 according to an example may include at least one of a processor 110, a display 120, a camera 130, a side mirror controller 140, or a steering controller 150, or any combination thereof. The processor 110, the display 120, the camera 130, the side mirror controller 140, or the steering controller 150 may be electronically or operably coupled with each other by an electronical component including a communication bus.

Hereinafter, that pieces of hardware are operably coupled with each other may include that a direct connection or an indirectly connection between the pieces of hardware is established in a wired or wireless manner, such that second hardware is controlled by first hardware among the pieces of hardware. The different blocks are illustrated, but an example is not limited thereto. For example, some of the pieces of hardware of FIG. 1 may be included in a single integrated circuit including a system on a chip (SoC). Types of the pieces of hardware included in the vehicle control apparatus 100 or the number of the pieces of hardware are limited to those shown in FIG. 1. For example, the vehicle control apparatus 100 may include some of the pieces of hardware shown in FIG. 1.

The processor 110 of the vehicle control apparatus 100 according to an example may include hardware for processing data based on one or more instructions. The hardware for processing the data may include the processor 110. For example, the hardware for processing the data may include at least one of an arithmetic and logic unit (ALU), a floating point unit (FPU), a field programmable gate array (FPGA), a central processing unit (CPU), or an application processor (AP), or any combination thereof.

For example, the processor 110 may have a structure of a single-core processor or may have a structure of a multi-core processor including a dual core, a quad core, a hexa core, or an octa core.

The display 120 of the vehicle control apparatus 100 according to an example may provide a user with visualized information. For example, the display 120 may be controlled by at least one of the processor 110 or a graphic processing unit (GPU) (not shown), or any combination thereof to provide the user with visualized information.

For example, the display 120 may include at least one of a flat panel display (FPD) or an electronic paper, or any combination thereof. The FPD may include at least one of a liquid crystal display (LCD), a plasma display panel (PDP), a digital mirror device (DMD), one or more light emitting diodes (LEDs), a micro-LED, or a flexible display, or any combination thereof. The LED may include an organic LED (OLED). However, examples of the present disclosure are not limited thereto.

For another example, the display 120 may include a touch panel. Based on an external object (e.g., a finger of the user) floating on the display 120, the display 120 including the touch panel may identify an input to a position of the identified external object on the display 120. The side mirror controller 140 which will be described below may be provided as a separate hardware component or may be provided as a software component.

For example, if the side mirror controller 140 is provided as the software component, it may provide a user interface (UI) associated with controlling a side mirror on a screen displayed on the display 120.

The camera 130 of the vehicle control apparatus 100 according to an example may include one or more of optical sensors (e.g., charged coupled device (CCD) sensors or complementary metal oxide semiconductor (CMOS) sensors) which generate an electrical signal indicating at least one of a color of light or a brightness of the color, or any combination thereof. The optical sensor included in the camera 130 may be disposed in the form of a 2-dimensional (2D) array.

The camera 130 may obtain electrical signals of the plurality of optical sensors substantially at the same time and may generate an image or a frame including a plurality of pixels which corresponds to light arriving at the optical sensors in the 2D array and are arranged in 2 dimensions. For example, photo data captured using the camera 130 may refer to an image obtained from the camera 130. For example, video data captured using the camera 130 may refer to a sequence of a plurality of images obtained according to a specified frame rate from the camera 130.

For example, the camera 130 may obtain an image in a direction the rear of a vehicle including the vehicle control apparatus 100 faces. Furthermore, if the plurality of cameras including the camera 130 is included in the vehicle, the vehicle control apparatus 100 may display at least one of a top-view image or a round-view image on the display 120, based on images obtained using the plurality of cameras.

For example, the top-view image may include an image in which the direction the rear of the vehicle faces is looked down from the top of the vehicle. For example, the round-view image may include an image including the entire appearance of the vehicle and the entire appearance of a trailer (or at least a portion of the appearance of the trailer). A description associated with the top-view image and the round-view image will be described with reference to FIG. 3.

The side mirror controller 140 of the vehicle control apparatus 100 according to an example may control a side mirror provided in the vehicle including the vehicle control apparatus 100. For example, the side mirror controller 140 may include a hardware component or a software component for controlling the side mirror included in the vehicle.

If the side mirror controller 140 is the hardware component, it may include a plurality of buttons. For example, the side mirror controller 140 may include first buttons for controlling the side mirror in a left and right direction and second buttons for controlling the side mirror in an up and down direction. For example, the first buttons may include a left button corresponding to a left direction and a right button corresponding to a right direction.

For example, the second buttons may include an up button corresponding to an up direction and a down button corresponding to a down direction.

The side mirror controller 140 may control a direction the side mirror faces to move in a direction corresponding to each of the buttons, based on an input to at least one of the first buttons or the second buttons, or any combination thereof.

The side mirror controller 140 of the vehicle control apparatus 100 according to an example may include a touch panel. For example, if the side mirror controller 140 includes the touch panel, it may identify an external object (e.g., a finger of the user) floating on the side mirror controller 140. The side mirror controller 140 may identify an input corresponding to a position of the external object, based on identifying the external object.

For example, the side mirror controller 140 may identify a gesture input. For example, the side mirror controller 140 may identify at least one of a swipe gesture, a drag gesture, a single-tap gesture, or a double-tap gesture, or any combination thereof. Types of the gesture inputs are not limited to those described above.

For example, the side mirror controller 140 may
identify a first gesture input (e.g., a drag gesture or a swipe gesture) including a first specified direction (or a lateral direction). The side mirror controller 140 may control a direction the side mirror faces to move in a direction corresponding to a first direction, based on the first gesture input including the first specified direction.

For another example, the side mirror controller 140 may identify a second gesture input (e.g., a drag gesture or a swipe gesture) including a second specified direction (or a longitudinal direction) perpendicular to the first specified direction. The side mirror controller 140 may control a direction the side mirror included in the vehicle faces to move in a direction corresponding to a second direction, based on the second gesture input including the second specified direction.

The first gesture input and the second gesture input, which are described above, may be divided to correspond to the first specified direction and the second specified direction and may be substantially the same input.

The steering controller 150 of the vehicle control apparatus 100 according to an example may control steering of the vehicle including the vehicle control apparatus 100. For example, the steering controller 150 may change a driving direction of the vehicle.

For example, the steering controller 150 may include at least one of a steering wheel for receiving a driving direction from a driver, a steering gear for switching rotational motion of the steering wheel to reciprocating motion, or a steering link for delivering the reciprocating motion of the steering gear to front wheels included in the vehicle, or any combination thereof. The steering controller 150 may change the direction of a rotational axis of the front wheels to change a driving direction of the vehicle.

The processor 110 of the vehicle control apparatus 100 according to an example may activate a function for assisting with reverse driving, in a state where the vehicle is connected with the trailer. For example, the function for assisting with the reverse driving may include a function for detecting an external object different from the vehicle in a direction the rear of the vehicle faces and providing an image in the direction the rear of the vehicle faces on the display 120. For example, the function for assisting with the reverse driving may be referred to as a smart parking assist system (SPAS). However, examples of the present disclosure are not limited thereto. For example, the function for assisting with the reverse driving may include a trailer driving assistance function.

The processor 110 of the vehicle control apparatus 100 may obtain an image using the camera 130, based on activating the function for assisting with the reverse driving, in the state where the vehicle is connected with the trailer. For example, the processor 110 may display the image obtained using the camera 130 on the display 120. For example, the processor 110 may display a screen including the image obtained by means of the camera 130.

In an example, the processor 110 may display a first visual object indicating a drawbar extended towards the trailer from a coupler connected with the vehicle and the trailer and a second visual object associated with controlling the steering controller 150, together with the image obtained by means of the camera 130, on the display 120.

For example, the first visual object may include at least one of the drawbar or the coupler, or any combination thereof. For example, the second visual object may include a bar shape, a quadrangular shape, or an oval shape. However, examples of the present disclosure are not limited thereto. For example, the second visual object may be displayed in a form where the shape of the drawbar is simplified.

In an example, when activating the function for assisting with the reverse driving, the processor 110 may identify at least one of the coupler or the drawbar, or any combination thereof in the image obtained by means of the camera 130. The processor 110 may superimpose and display the first visual object and the second visual object, based on identifying the at least one of the coupler or the drawbar, or the any combination thereof in the image obtained by means of the camera 130.

In an example, activating the function for assisting with the reverse driving, the processor 110 may identify a first portion in the first visual object, which corresponds to the coupler. The processor 110 may identify a second portion of the second visual object, which corresponds to one end of the second visual object The processor 110 may perform an operation of rotating the other end of the second visual object, in a state where the first portion and the second portion are superimposed on each other, based on identifying the first portion and the second portion.

For example, the processor 110 may perform the operation of rotating the other end of the second visual object, in the state where the first portion and the second portion are superimposed on each other, based on an input to the side mirror controller 140.

While displaying the screen including the at least one of the first visual object or the second visual object, or any combination thereof, the processor 110 of the vehicle control apparatus 100 according to an example may identify an input to the side mirror controller 140. The processor 110 may rotate the other end of the second visual object using the second portion as an axis, in a state where the first portion in the first visual object, which corresponds to the coupler, and the second portion corresponding on the one end of the second visual object are superimposed on each other, based on the input to the side mirror controller 140.

For example, if the side mirror controller 140 includes physical buttons, the processor 110 may rotate the other end of the second visual object in response to an input to one of the buttons. For example, the processor 110 may rotate the other end of the second visual object, based on an input to first buttons indicating a lateral direction among the buttons.

For example, the processor 110 may rotate the other end of the second visual object counterclockwise, based on an input to a left button among the first buttons. For example, the processor 110 may rotate the other end of the second visual object clockwise, based on an input to a right button among the first buttons. For example, the processor 110 may change a location of the second visual object to a reference location, based on an input to one of second buttons different from the first buttons.

For example, the reference location may include a segment connecting the center of a third periphery facing a second periphery longer than a first periphery with the center of the second periphery among peripheries configuring the obtained image. For example, the first periphery may include a left periphery of the image or a right periphery of the image. For example, the second periphery may include an upper periphery of the image or a lower periphery of the image. For example, the third periphery may include a lower periphery of the image or an upper periphery of the image.

In an example, the processor 110 may control steering, such that the first visual object and the second visual object are superimposed on each other, by means of the steering controller 150, based on identifying the rotation of the other end of the second visual object. For example, the processor 110 may change a driving direction of the vehicle by means of the steering controller 150.

For example, the processor 110 may rotate the steering wheel clockwise by means of the steering controller 150, based on identifying the counterclockwise rotation of the other end of the second visual object. The processor 110 may change a driving direction of the vehicle by rotating the steering wheel.

According an example, the processor 110 may control a speed of the vehicle together with controlling the steering controller 150. For example, the processor 110 may control a speed together with controlling the steering wheel to superimpose the first visual object and the second visual object, thus assisting the vehicle to back up.

As described above, the processor 110 of the vehicle control apparatus 100 according to an example may display the rear of the vehicle on the display 120, based on activating the function for assisting with the reverse driving. While displaying the rear of the vehicle, the processor 110 may control an angle between the vehicle and the trailer to perform reverse driving, thus increasing the convenience of the user.

Figure 2:
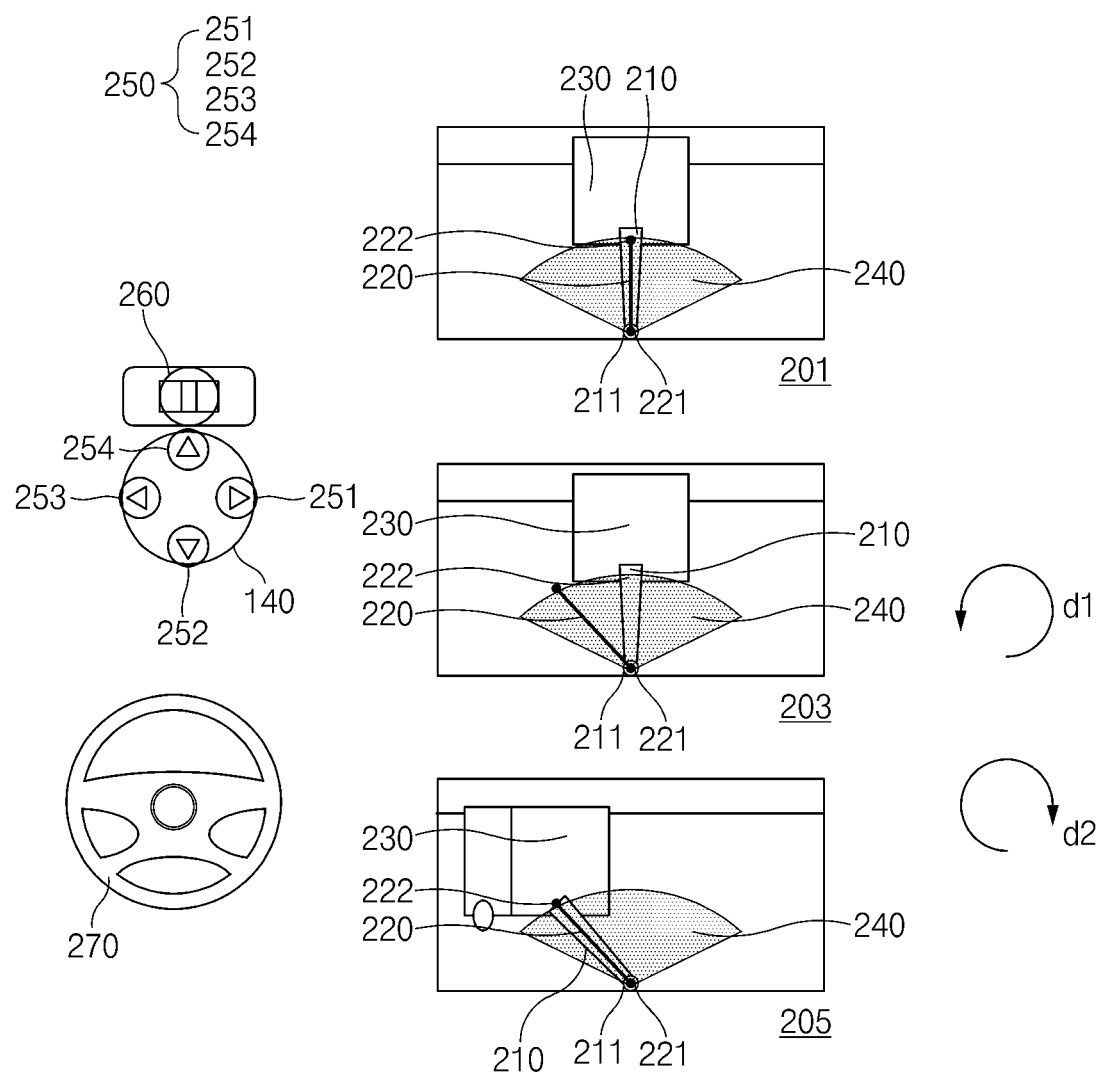
FIG. 2 shows an example associated with a usage state of a vehicle control apparatus according to an example of the present disclosure.

FIG. 2 shows an example associated with a usage state of a vehicle control apparatus according to an example.

Operations of FIG. 2 may be performed by a processor 110 included in a vehicle control apparatus 100 of FIG. 1.

Referring to FIG. 2, the vehicle control apparatus according to an example may include at least one of a side mirror controller 140 for controlling a side mirror included in a vehicle, a switch 260 for selecting one of a plurality of side mirrors, or a steering wheel 270, or any combination thereof.

Referring to a first example 201 of FIG. 2, a processor of the vehicle control apparatus according to an example may activate a function for assisting with reverse driving, in a state where the vehicle is connected with a trailer 230. The processor may obtain an image using a camera, based on activating the function for assisting with the reverse driving.

For example, if activating the function for assisting with the reverse driving, the processor may superimpose and display a first visual object and a second visual object 220, based on identifying at least one of a coupler 211 or a drawbar 210, or any combination thereof in the obtained image.

For example, the processor may display the first visual object indicating the drawbar 210 extended towards the trailer 230 from the coupler 211 connected with the vehicle and the trailer 230, together with the image obtained using the camera. The processor may display the second visual object 220 associated with controlling a steering controller. As described above, in an example, the processor may display the first visual object indicating the drawbar 210 extended towards the trailer 230 from the coupler 211 connected with the vehicle and the trailer 230 and the second visual object 220 associated with controlling the steering controller (e.g., a steering controller 150 of FIG. 1), together with the image obtained using the camera.

According an example, the processor may superimpose and display a range 240 in which the second visual object 220 is rotatable on the image obtained using the camera. For example, the range 240 in which the second visual object 220 is rotatable may include a range in which the other end 222 of the second visual object 220 is rotatable in response to an input to the side mirror controller 140. For example, the processor may control the second visual object 220 within the range 240 in which the second visual object 220 is rotatable.

The processor of the vehicle control apparatus according to an example may identify an input to the side mirror controller 140. The one example of FIG. 2 includes one example in which the side mirror controller 140 includes a physical button, and an example is not limited thereto. For example, the side mirror controller 140 may be provided as a software component for controlling a side mirror on a display (e.g., a display 120 of FIG. 1) and may be provided as an input device including a touch panel.

For example, the processor may identify an input to the side mirror controller 140 including a plurality of buttons 250. For example, the input to the side mirror controller 140 including the plurality of buttons 250 may include an input for pushing one of the plurality of buttons 250.

In an example, the processor may identify an input to first buttons 251 and 253 among the plurality of buttons 250. For example, the first buttons 251 and 253 may include buttons indicating a lateral direction. For example, the processor may rotate the other end 222 of the second visual object 220, in a state where a second portion 221 corresponding to one end of the second visual object 220 is superimposed, based on identifying the input to the first buttons 251 and 253.

In an example, the processor may identify an angle between a segment connecting the center of a third periphery facing a second periphery longer than a first periphery with the center of the second periphery among peripheries configuring the image obtained using the camera and the second visual object 220. For example, the angle between the segment connecting the center of the third periphery with the center of the second periphery and the second visual object 220 which rotates in a first rotational direction d1 may be expressed as a negative number. For example, the angle between the segment connecting the center of the third periphery with the center of the second periphery and the second visual object 220 which rotates in a second rotational direction d2 may be expressed as a positive number.

For example, the processor may identify 0°, based on that the segment connecting the center of the third periphery with the center of the second periphery is identical to the second visual object 220. The processor may identify that the angle between the segment connecting the center of the third periphery with the center of the second periphery and the second visual object 220 is a positive number, based on the rotating the other end 222 of the second visual object 220 in the second rotational direction d2. The processor may identify that the angle between the segment connecting the center of the third periphery with the center of the second periphery and the second visual object 220 is a negative number, based on the rotating the other end 222 of the second visual object 220 in the first rotational direction d1.

In an example, the processor may rotate the other end 222 of the second visual object 220 by a first specified angle, based on the input to the side mirror controller 140 during a first specified time. For example, the processor may rotate the other end 222 of the second visual object 220 at the first specified angle, based on the input to the side mirror controller 140 during the first specified time, by a number corresponding to the input to the side mirror controller 140. For example, the first specified angle may include about 1 degree.

In an example, the processor may identify an input to the side mirror controller 140 during a second specified time longer than the first specified time. For example, the processor may rotate the other end 222 of the second visual object 220 during a time corresponding to the end of a continuous input after the second specified time longer than the first specified time, based on the input to the side mirror controller 140 during the second specified time. For example, the continuous input may include maintenance of an input for pushing one of the first buttons 251 and 253 included in the side mirror controller 140.

In an example, the processor may identify that the angle between the segment connecting the center of the third periphery with the center of the second periphery and the second visual object 220 is included within the specified range 240. The processor may rotate the second visual object 220 or may change a location of the second visual object 220, based on identifying the angle between the segment connecting the center of the third periphery with the center of the second periphery and the second visual object 220, which is greater than the specified range 240.

For example, the processor may rotate the second visual object 220 to correspond to a maximum value of the specified range 240, based on that the angle between the segment connecting the center of the third periphery with the center of the second periphery and the second visual object 220 is greater than a positive value of the specified range 240. Alternatively or additionally, the processor may change a location of the second visual object 220 to correspond to the maximum value of the specified range 240, based on that the angle between the segment connecting the center of the third periphery with the center of the second periphery and the second visual object 220 is greater than the positive value of the specified range 240.

For example, the processor may rotate the second visual object 220 to correspond to a minimum value of the specified range 240, based on that the angle between the segment connecting the center of the third periphery with the center of the second periphery and the second visual object 220 is less than a negative value of the specified range 240. Alternatively or additionally, the processor may change a location of the second visual object 220 to correspond to the minimum value of the specified range 240, based on that the angle between the segment connecting the center of the third periphery with the center of the second periphery and the second visual object 220 is less than the negative value of the specified range 240.

In an example, the processor may identify an absolute value of the angle between the segment connecting the center of the third periphery with the center of the second periphery and the second visual object 220. The processor may rotate the other end 222 of the second visual object 220 by a second specified angle, based on that the absolute value of the angle between the segment connecting the center of the third periphery with the center of the second periphery and the second visual object 220 is less than a reference value. For example, the second specified angle may include the first specified angle.

In an example, the processor may rotate the other end 222 of the second visual object 220 by a third specified angle greater than the second specified angle, based on that the absolute value of the angle between the segment connecting the center of the third periphery with the center of the second periphery and the second visual object 220 is greater than or equal to the reference value.

Referring to a second example 203 of FIG. 2, the processor may rotate the other end 222 of the second visual object 220 using the second portion 221 as an axis, in a state where the first portion 211 in the first visual object, which corresponds to the coupler, and the second portion 221 corresponding to the one end of the second visual object 220 are superimposed on each other.

For example, the processor may rotate the other end 222 of the second visual object 220 within the range 240 in which the second visual object 220 is rotatable, in the state where the first portion 211 and the second portion 221 are superimposed on each other.

For example, the processor may identify an input to the first buttons 251 and 253 for rotating the second visual object 220 among the buttons 250 included in the side mirror controller 140. As an example, the processor may identify an input to a left button (e.g., the first button 253). The processor may rotate the other end 222 of the second visual object 220 in the first rotational direction d1, based on identifying the input to the left button 253. For example, the first rotational direction d1 may be referred to as counter-clockwise direction. For example, the second rotational direction d2 opposite to the first rotational direction d1 may be referred to as a clockwise direction.

Although not illustrated in the drawing, as another example, the processor may rotate the other end 222 of the second visual object 220 in the second direction d2, based on the input to a right button (e.g., the first button 251).

The vehicle control apparatus according to an example may include the switch 260 for selecting one of the plurality of side mirrors. For example, the switch 260 may express a state where a left side mirror is selected, a state where a right side mirror is selected, or a state where one of the plurality of side mirrors is not selected.

For example, if the switch 260 is located on the left by a user, it may include a state for controlling the left side mirror. For example, if the switch 260 is located on the right by the user, it may include a state for controlling the right side mirror. For example, if the switch 260 is located on the middle by the user, it may include a state where any one of the plurality of side mirrors is not controlled. The processor may rotate the other end 222 of the second visual object 220, based on identifying to the input to the side mirror controller 140, in a state where any one of the plurality of side mirrors is not controlled.

Referring to a third example 205 of FIG. 2, the processor of the vehicle control apparatus according to an example may control steering, such that the first visual object and the second visual object 220 are superimposed on each other, by means of a steering controller, based on identifying the rotation of the other end 222 of the second visual object 220.

For example, the processor may control a steering wheel 270 by means of the steering controller to control steering of the vehicle.

For example, the processor may identify that the other end 222 of the second visual object 220 rotates in the first rotational direction d1. The processor may control steering in the second rotational direction d2, based on identifying that the other end 222 of the second visual object 220 rotates in the first rotational direction d1. For example, the processor may change a driving direction of the vehicle to the second rotational direction d2 opposite to the first rotational direction d1 by means of the steering controller.

In an example, the processor may identify an input to the second buttons 252 and 254 different from the first buttons 251 and 253 for rotating the second visual object 220 among the buttons 250 included in the side mirror controller 140. The processor may change the second visual object 220 to a reference location in a screen displayed on the display, based on the input to one of the second buttons 252 and 254.

For example, the second buttons 252 and 254 may include a lower button and an upper button respectively. For example, the reference location may be included in the segment connecting the center of the third periphery facing the second periphery longer than the first periphery with the center of the second periphery among the peripheries configuring the image obtained by means of the camera. Although the reference location is described based on the peripheries configuring the image obtained by means of the camera, it may be formed on a segment extended along the drawbar 210, towards the trailer 230 from the first portion 211 corresponding to the coupler.

As described above, the processor of the vehicle control apparatus according to an example may activate a function for assisting with reverse driving, in a state where the vehicle and the trailer are connected with each other. The processor may obtain an image using the camera, based on activating the function for assisting with the reverse driving, in the state where the vehicle and the trailer 230 are connected with each other. The processor may display the first visual object indicating the drawbar 210 extended towards the trailer 230 from the coupler 211 connected with the vehicle and the trailer 230 and the second visual object 220 associated with controlling the steering controller, together with the image obtained using the camera, on the display. The processor may rotate the other end 222 of the second visual object 220 using the second portion 221 as an axis, in a state where the first portion in the first visual object, which corresponds to the coupler 211, and the second portion 221 corresponding to the one end of the second visual object 220 are superimposed on each other, based on the input to the side mirror controller 140. The processor may control steering, such that the first visual object and the second visual object 220 are superimposed on each other, by means of the steering controller, based on identifying the rotation of the other end 222 of the second visual object 220. The processor may control the steering, such that the first visual object and the second visual object 220 are superimposed on each other, thus increasing the convenience of the user and reinforcing user experience.

The one example of the side mirror controller 140 including the physical button is illustrated in FIG. 2, and an example is not limited thereto. For example, referring to FIG. 4, the side mirror controller of the vehicle control apparatus may include a touch panel. Detailed contents will be described with reference to FIG. 4.

Figure 3:
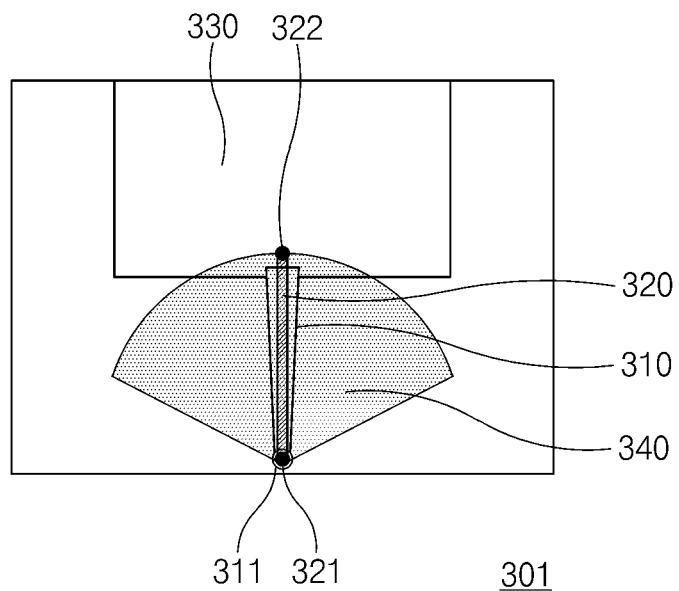
FIG. 3 shows an example associated with a usage state of a vehicle control apparatus according to an example of the present disclosure.
Figure 3:
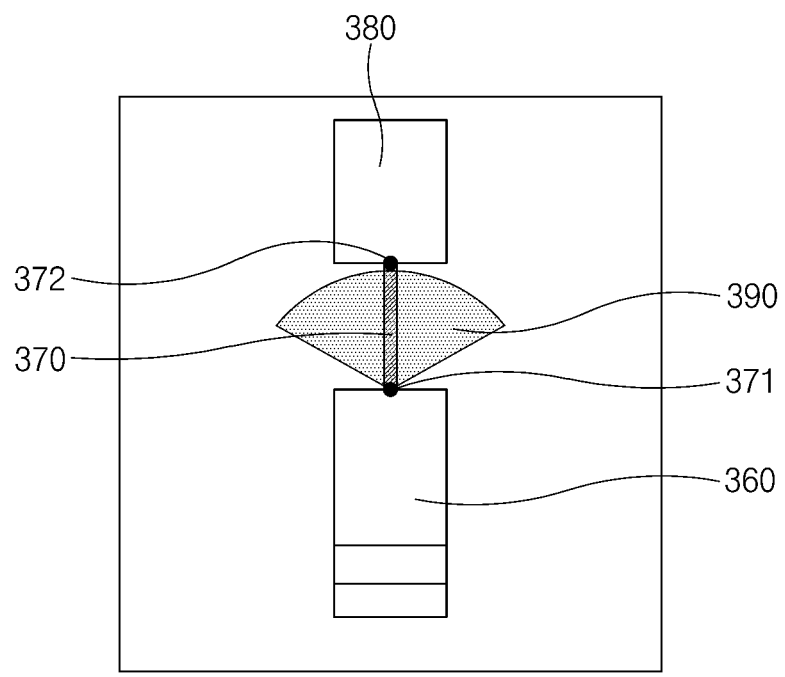

FIG. 3 shows an example associated with a usage state of a vehicle control apparatus according to an example.

Operations of FIG. 3 may be performed by a processor 110 included in a vehicle control apparatus 100 of FIG. 1.

Referring to FIG. 3, the vehicle control apparatus according to an example may include a plurality of cameras including a camera 130 of FIG. 1. The processor may obtain a plurality of images using the plurality of cameras. The processor may obtain at least one of a top-view image or a round-view image, based on the images obtained by the plurality of cameras. For example, the processor may display the at least one of the top-view image or the round-view image on a display (e.g., a display 120 of FIG. 1), based on obtaining the at least one of the top-view image or the round-view image. As described above, the processor may display the at least one of the top-view image or the round-view image on the display, based on the images obtained by the plurality of cameras.

A fourth example 301 of FIG. 3 may include an example of a usage state of the vehicle control apparatus which displays the top-view image on the display. For example, the processor may display a first visual object indicating a drawbar 310 extended towards a trailer 330 from a coupler 311 connected with the vehicle and the trailer 330, in the top-view image. The processor may display a second visual object 320 associated with controlling a steering controller, in the top-view image.

In an example, the processor may display at least one of a part of the trailer 330, the first visual object indicating the drawbar 310, the second visual object 320 associated with controlling the steering controller, or a specified range 340 indicating a range in which the second visual object 320 is rotatable, or any combination thereof, in the top-view image.

As described above, the processor may display the first visual object indicating the drawbar 310 extended towards the trailer 330 from the coupler 311 connected with the vehicle and the trailer 330 and the second visual object 320 associated with controlling the steering controller, together with the top-view image, on the display.

In an example, while displaying the top-view image, the processor may identify an input to a side mirror controller (e.g., a side mirror controller 140 of FIG. 1). The processor may rotate the other end 322 of the second visual object 320 using a second portion 321 as an axis, in a state where a first portion in the first visual object, which corresponds to the coupler 311, and the second portion 321 corresponding to one end of the second visual object 320 are superimposed on each other, based on the input to the side mirror controller.

In an example, the processor may control steering, such that the first visual object and the second visual object 320 are superimposed on each other, by means of the steering controller, based on identifying the rotation of the other end 322 of the second visual object 320, in the top-view image.

A fifth example 303 of FIG. 3 may include an example of a usage state of the vehicle control apparatus which displays the round-view image on the display. For example, the processor may display a first visual object indicating a drawbar extended towards a trailer 380 from a coupler connected with a vehicle 360 and the trailer 380, in the round-view image. The processor may display second visual object 370 associated with controlling a steering controller, in the round-view image.

In an example, the processor may display at least one of the vehicle 360, the trailer 380, the first visual object indicating the drawbar, the second visual object 370 associated with controlling the steering controller, or a specified range 390 indicating a range in which the second visual object 370 is rotatable, or any combination thereof, in the round-view image.

As described above, the processor may display the first visual object indicating the drawbar extended towards the trailer 380 from the coupler connected with the vehicle 360 and the trailer 380 and the second visual object 370 associated with controlling the steering controller, together with the round-view image, on the display.

In an example, while displaying the round-view image, the processor may identify an input to the side mirror controller. The processor may rotate the other end 372 of the second visual object 370 using a second portion 371 as an axis, in a state where a first portion in the first visual object, which corresponds to the coupler, and the second portion 371 corresponding to one end of the second visual object 370 are superimposed on each other, based on the input to the side mirror controller.

In an example, the processor may control steering, such that the first visual object and the second visual object 370 are superimposed on each other, by means of the steering controller, based on identifying the rotation of the other end 372 of the second visual object 370, in the round-view image.

As described above, the processor of the vehicle control apparatus according to an example may generate one of the top-view image or the round-view image, based on the images obtained by means of the plurality of cameras. While displaying the one of the top-view image or the round-view image on the display, the processor may activate a function for assisting with reverse driving, may display the first visual object indicating the drawbar extended towards the trailer from the coupler connected with the vehicle and the trailer and the second visual object associated with controlling the steering controller, may rotate the other end of the second visual object using a second portion as an axis, in the state where the first portion in the visual object, which corresponds to the coupler, and the second portion corresponding to the one end of the second visual object are superimposed on each other, based on the input to the side mirror controller, and may control steering, such that the first visual object and the second visual object are superimposed on each other, by means of the steering controller, based on the rotation of the other end of the second visual object. The processor may control the steering, such that the first visual object and the second visual object are superimposed on each other, thus increasing the convenience of the user and reinforcing user experience.

Figure 4:
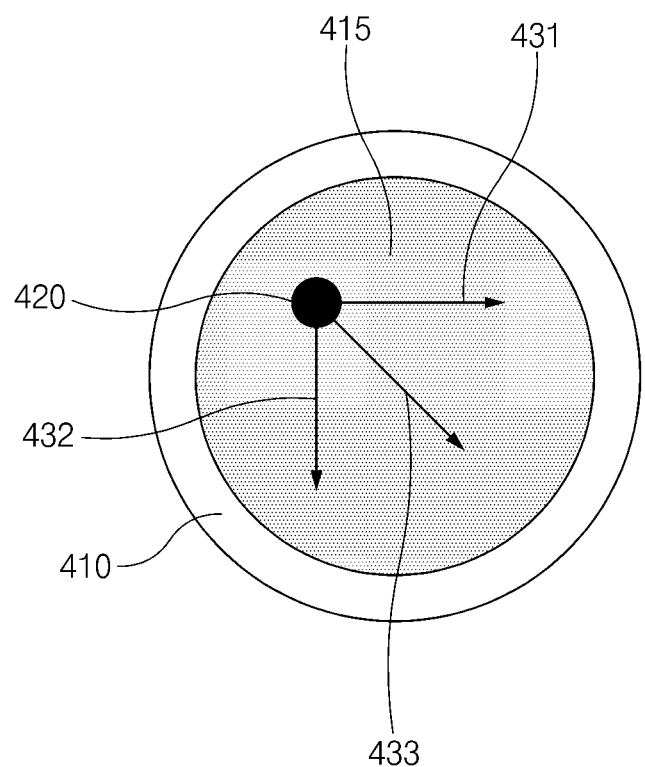
FIG. 4 shows an example of a side mirror controller included in a vehicle control apparatus according to an example of the present disclosure.

FIG. 4 shows an example of a side mirror controller included in a vehicle control apparatus according to an example.

Operations of FIG. 4 may be performed by a processor 110 included in a vehicle control apparatus 100 of FIG. 1.

Referring to FIG. 4, the vehicle control apparatus according to an example may include a side mirror controller 410. For example, the side mirror controller 410 may include a touch panel for identifying an input of an external object. For example, the side mirror controller 410 may identify an external object floating on a touch area 415, based on the touch panel.

In an example, a processor may identify a touch input by the external object on the touch area 415. For example, the processor may identify a gesture input by the external object on the touch area 415.

For example, the touch input or the gesture input may include at least one of a single-tap input, a double-tap input, a drag input, a swipe input, or a pinch to zoom input, or any combination thereof.

In an example, the processor may identify a drag input or a swipe input to the side mirror controller 410. For example, the drag input or the swipe input may include that the touch input is ended at a second point different from a first point 420 in a state where the touch input of the first point 420 on the touch area 415 is maintained.

For example, the processor may identify a first gesture input including a first specified direction 431 on the touch area 415 of the side mirror controller 410. For example, the first gesture input may include at least one of a drag input or a swipe input, or any combination thereof. For example, the first gesture input including the first specified direction 431 may correspond to an input to one of first buttons (e.g., first buttons 251 and 253 of FIG. 2) of a side mirror controller (e.g., a side mirror controller 140 of FIG. 2) including a physical button.

FIG. 4 shows that the first specified direction 431 is the direction towards the right from the first point 420, but the first specified direction 431 may include a lateral direction. For example, the first specified direction 431 may include at least one of a left direction or a right direction, or any combination thereof. For example, the first gesture input including the first specified direction 431 may include an input identified that an angle between a segment connecting the second point with the first point 420 and an x-axis is within about ±30°.

In an example, the processor may rotate a second visual object associated with controlling a steering controller in a rotational direction corresponding to the first specified direction 431, based on identifying the first gesture input including the first specified direction 431.

For example, the processor may rotate the second visual object associated with controlling the steering controller counterclockwise, based on identifying the first gesture input towards a left direction from the first point 420. For example, the processor may rotate the second visual object associated with controlling the steering controller clockwise, based on identifying the first gesture input towards a right direction from the first point 420.

In an example, the processor may identify a second gesture input including a second specified direction 432 perpendicular to the first specified direction 431. For example, including the second specified the second gesture input direction 432 may include at least one of a drag input or a swipe input, or any combination thereof. For example, the second gesture input including the second specified direction 432 may correspond to an input to one of second buttons (e.g., second buttons 252 and 254 of FIG. 2) of the side mirror controller including the physical button.

FIG. 4 shows that the second specified direction 432 is the direction towards the bottom from the first point 420, but the second specified direction 432 may include a longitudinal direction. For example, the second specified direction 432 may include a bottom direction or a top direction, or any combination thereof. For example, the second gesture input including the second specified direction 432 may include an input identified that an angle between a segment connecting the second point with the first point 420 and a y-axis is within about ±30°.

In an example, the processor may change the second visual object associated with controlling the steering controller to a reference location in a screen displayed on the display, based on identifying the second gesture input including the second specified direction 432 perpendicular to the first specified direction 431. For example, the reference location may include a segment connecting the center of a third periphery facing a second periphery longer than a first periphery with the center of the second periphery among peripheries configuring the screen (or the image).

According to an example, the processor may change the second visual object associated with controlling the steering controller to the reference location, based on identifying a double-tap input to the touch area 415. According to another example, the processor may change the second visual object associated with controlling the steering controller to the reference location, based on identifying a long-press input to the touch area 415. For example, the long-press input may include that an input on the touch area 415 is maintained during a specified duration or more.

In an example, the processor may identify a third gesture input including a third specified direction 433. For example, the third gesture input including the third specified direction 433 may include an input identified that the angle between the segment connecting the second point with the first point 420 and the x-axis is out of about ±30° and that the angle between the segment connecting the second point with the first point 420 and the y-axis is out of about ±30°.

In an example, the processor may provide a user with guidance for requesting a gesture input, using at least one of a display or a speaker, or any combination thereof, based on identifying the third gesture input including the third specified direction 433. For example, the third gesture input including the third specified direction 433 may include an input incapable of identifying an intention of the user.

The processor may provide guidance for requesting a gesture input again on the display, based on identifying the third gesture input including the third specified direction 433, which is incapable of identifying the intention of the user. For example, the processor may display text for requesting a gesture input again on the display, based on identifying the third gesture input including the third specified direction 433.

As described above, the processor of the vehicle control apparatus according to an example may control the second visual object associated with controlling the steering controller, based on the input to the side mirror controller including the touch panel. The processor may control the second visual object associated with controlling the steering controller using the touch panel, thus increasing the convenience of the user and reinforcing user experience.

Hereinafter, a description will be given in detail of a vehicle control method according to another example of the present disclosure with reference to FIG. 5.

Figure 5:
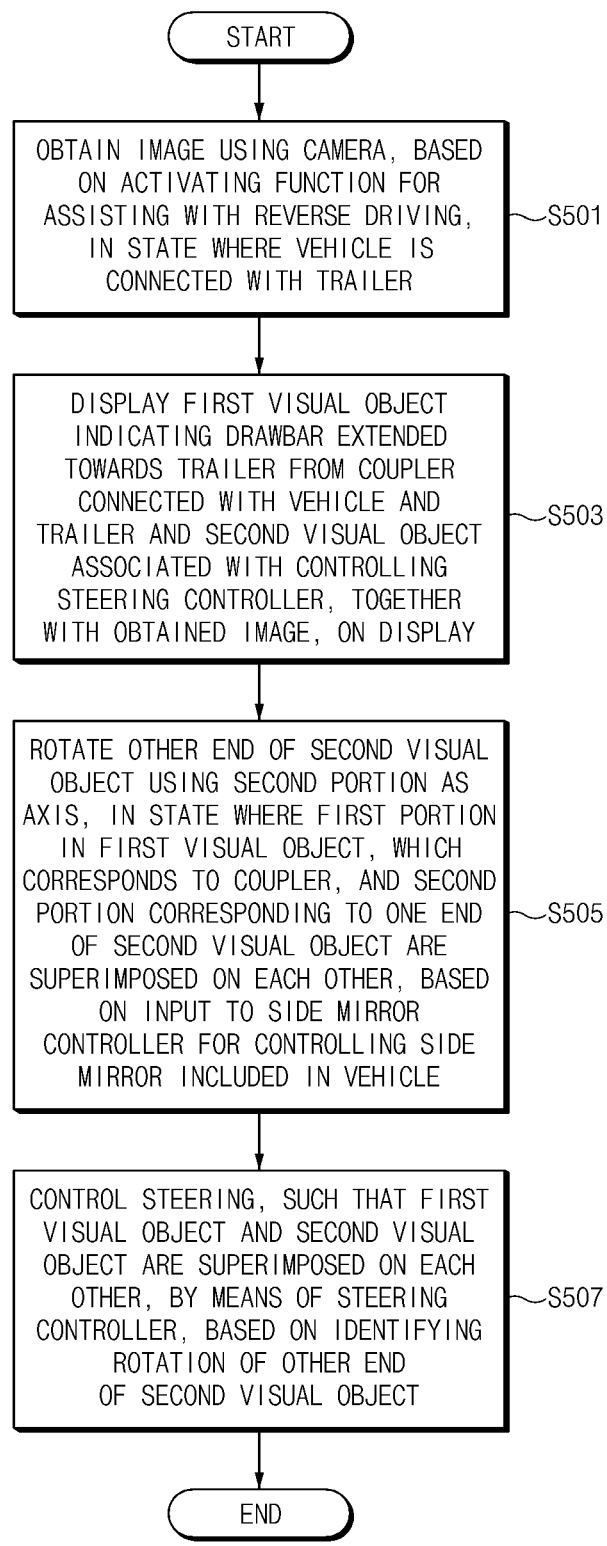
FIG. 5 shows an example of a flowchart about an operation of a vehicle control apparatus according to an example of the present disclosure.

FIG. 5 shows an example of a flowchart about an operation of a vehicle control apparatus according to an example of the present disclosure.

Hereinafter, it is assumed that a vehicle control apparatus 100 of FIG. 1 performs a process of FIG. 5. Furthermore, in a description of FIG. 5, an operation described as being performed by a processor of a vehicle control apparatus may be understood as being controlled by a processor 110 of the vehicle control apparatus 100.

At least one of the operations of FIG. 5 may be performed by the vehicle control apparatus 100 of FIG. 1. Respective operations of FIG. 5 may be sequentially performed, but are not necessarily sequentially performed. For example, an order of the respective operations may be changed, and at least two operations may be performed in parallel.

Referring to FIG. 5, in S501, the processor of the vehicle control apparatus according to an example may activate a function for assisting with reverse driving, in a state where a vehicle is connected with a trailer. The processor may obtain an image using a camera, based on activating the function for assisting with the reverse driving, in the state where the vehicle is connected with the trailer.

In an example, when activating the function for assisting with the reverse driving, the processor may identify at least one of a coupler or a drawbar, or any combination thereof in the image obtained by means of the camera. The processor may superimpose and display a first visual object and a second visual object associated with controlling a steering controller, based on identifying the at least one of the coupler or the drawbar, or the any combination thereof in the image obtained by means of the camera.

In S503, according an example, the processor may display the first visual object indicating the drawbar extended towards the trailer from the coupler connected with the vehicle and the trailer and the second visual object associated with controlling the steering controller for controlling steering of the vehicle, together with the obtained image, on the display.

For example, the first visual object may include a visual object in which at least one of the coupler, the drawbar, or the any combination thereof is simplified. For example, the first visual object may include a visual object including the at least one of the coupler, the drawbar, or the any combination thereof.

For example, the second visual object may include a bar shape, a quadrangular shape, or an oval shape. For example, the second visual object may include a visual object for controlling the steering controller.

In S505, according an example, the processor may identify an input to a side mirror controller for controlling a side mirror included in the vehicle. The processor may rotate the other end of the second visual object using a second portion as an axis, in a state where a first portion in the first visual object, which corresponds to the coupler, and the second portion corresponding on one end of the second visual object are superimposed on each other, based on the input to the side mirror controller.

For example, the processor may rotate the other end of the second visual object at a first specified angle, based on the input to the side mirror controller during a first specified time, which may rotate the other end of the second visual object by a number corresponding to the input to the side mirror controller.

For example, the processor may rotate the other end of the second visual object during a time corresponding to the end of a continuous input after a second specified time longer than the first specified time, based on the continuous input to the side mirror controller during the second specified time.

According an example, the side mirror controller may include a plurality of buttons for controlling a direction a side mirror faces or may include a touch panel for identifying a touch input (or a gesture input).

In S507, according an example, the processor may control steering, such that the first visual object and the second visual object are superimposed on each other, by means of the steering controller, based on identifying the rotation of the other end of the second visual object.

For example, the processor may control steering counterclockwise by means of the steering controller, based on that the other end of the second visual object rotates clockwise. For example, the processor may control steering clockwise by means of the steering controller, based on that the other end of the second visual object rotates counterclockwise.

As described above, the processor of the vehicle control apparatus according to an example may control steering, such that the first visual object and the second visual object are superimposed on each other, thus increasing the convenience of a user which is unfamiliar with reverse driving of the vehicle connected with the trailer.

Figure 6:
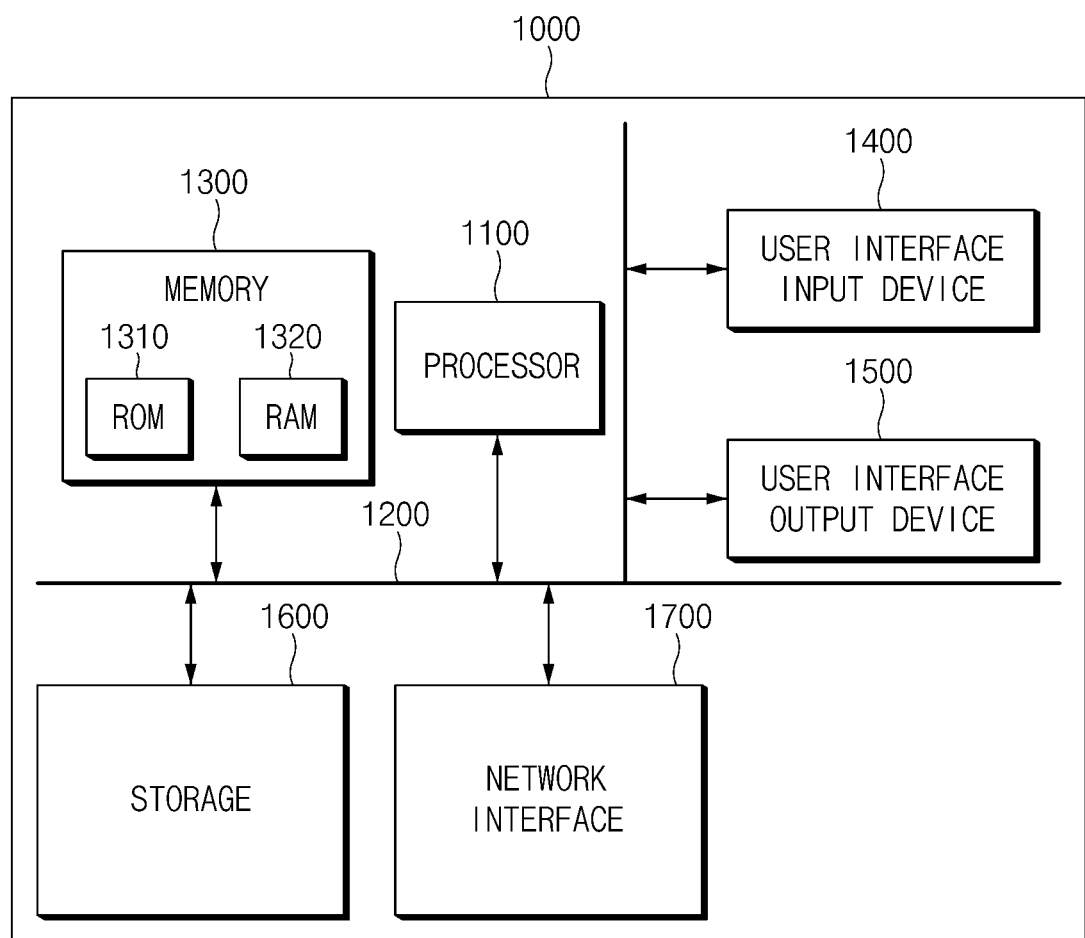
FIG. 6 shows a computing system according to an example of the present disclosure.

FIG. 6 shows a computing system according to an example of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively or additionally, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present disclosure has been made to solve the above-mentioned problems occurring in the prior art while advantages achieved by the prior art are maintained intact.

An aspect of the present disclosure provides a vehicle control apparatus associated with a function for assisting a vehicle connected with a trailer to back up and a method thereof.

Another aspect of the present disclosure provides a vehicle control apparatus for displaying a screen in a rear direction of a vehicle on a display for reverse driving of the vehicle connected with the trailer, matching an angle of the trailer in a direction desired by the user under control of the user, and providing a function for backing up the vehicle in the state where the angle of the trailer is matched and a method thereof.

Another aspect of the present disclosure provides a vehicle control apparatus for setting an angle of a trailer in a direction where a user wants to perform reverse driving, using hardware previously provided in the vehicle without adding new hardware, if the vehicle connected with the trailer backs up and controlling the vehicle depending on the set angle and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle control apparatus may include a processor, a display, a camera that obtains an image in a direction the rear of a vehicle faces, a side mirror controller that controls a side mirror included in the vehicle, and a steering controller that controls steering of the vehicle.

In an example, wherein the processor may obtain an image using the camera, based on activating a function for assisting with reverse driving, in a state where the vehicle is connected with a trailer, may display a first visual object indicating a drawbar extended towards from a coupler connected with the vehicle and the trailer and a second visual associated object with controlling the steering controller, together with the obtained image, on the display, may rotate the other end of the second visual object using a second portion as an axis, in a state where a first portion in the first visual object, the first portion corresponding to the coupler, and the second portion corresponding on one end of the second visual object are superimposed on each other, based on an input to the side mirror controller, and may control the steering, such that the first visual object and the second visual object are superimposed on each other, by means of the steering controller, based on identifying the rotation.

In an example, the processor may rotate the other end of the second visual object at a first specified angle, based on the input to the side mirror controller during a first specified time, by a number corresponding to the input and may rotate the other end of the second visual object during a time corresponding to end of a continuous input from a second specified time longer than the first specified time, based on the continuous input to the side mirror controller during the second specified time.

The vehicle control apparatus according to an example may include a switch that selects one of a plurality of side mirrors including the side mirror. The processor may rotate the other end of the second visual object, based on the input to the side mirror controller, in a state where one of the plurality of side mirrors is not selected by means of the switch.

In an example, the processor may change the second visual object to a reference location in a screen displayed on the display, based on an input to one of second buttons different from first buttons for rotating the second visual object among buttons included in the side mirror controller.

In an example, the processor may superimpose and display a range where the second visual object is rotatable on the obtained image on the display.

In an example, the processor may identify an angle between a segment connecting the center of a third periphery facing a second periphery longer than a first periphery with the center of the second periphery among peripheries configuring the obtained image and the second visual object, may rotate the second visual object such that the angle corresponds to a maximum value of a specified range, based on that the angle is greater than the specified range, and may rotate the second visual object such that the angle corresponds to a minimum value of the specified range, based on that the angle is less than the specified range. The angle may include a positive number in a clockwise direction with respect the segment and includes a negative number in a counterclockwise direction with respect to the segment.

In an example, the processor may identify an angle between a segment connecting the center of a third periphery facing a second periphery longer than a first periphery with periphery the center of the second among peripheries configuring the obtained image and the second visual object, may rotate the other end of the second visual object by a second specified angle, based on that an absolute value of the angle is less than a reference value, and may rotate the other end of the second visual object by a third specified angle greater than the second specified angle, based on that the absolute value of the angle is greater than or equal to the reference value.

The vehicle control apparatus according to an example may include a plurality of cameras including the camera. The processor may display at least one of a top-view image or a round-view image on the display, based on images obtained by means of the plurality of cameras, and may control the steering, such that the first visual object and the second visual object are superimposed on each other, based on rotating the other end of the second visual object, while the at least one of the top-view image or the round-view image is displayed.

In an example, the processor may identify a gesture input to the side mirror controller, may rotate the other end of the second visual object in a direction corresponding to a first specified direction, based on identifying a first gesture input including the first specified direction, and may change the second visual object to a reference location in a screen displayed on the display, based on identifying a second gesture input including a second specified direction perpendicular to the first specified direction.

In an example, the processor may superimpose and display the first visual object and the second visual object, based on identifying at least one of the coupler or the drawbar, or any combination thereof in the obtained image, when activating the function for assisting with the reverse driving.

According to another aspect of the present disclosure, a vehicle control method may include obtaining an image using a camera for obtaining an image in a direction the rear of the vehicle faces, based on activating a function for assisting with reverse driving, in a state where a vehicle is connected with a trailer, displaying a first visual object indicating a drawbar extended towards the trailer from a coupler connected with the vehicle and the trailer and a second visual object associated with controlling a steering controller for controlling steering of the vehicle, together with the obtained image, on a display, rotating the other end of the second visual object using a second portion as an axis, in a state where a first portion in the first visual object, the first portion corresponding to the coupler, and the second portion corresponding on one end of the second visual object are superimposed on each other, based on an input to a side mirror controller for controlling a side mirror included in the vehicle, and controlling the steering, such that the first visual object and the second visual object are superimposed on each other, by means of the steering controller, based on identifying the rotation.

The vehicle control method according to an example may further include rotating the other end of the second visual object at a first specified angle, based on the input to the side mirror controller during a first specified time, by a number corresponding to the input and rotating the other end of the second visual object during a time corresponding to end of a continuous input from a second specified time longer than the first specified time, based on the continuous input to the side mirror controller during the second specified time.

The vehicle control method according to an example may further include rotating the second visual object, based on the input to the side mirror controller, in a state where one of a plurality of side mirrors including the side mirror is not selected, by means of a switch for selecting one of the plurality of side mirrors.

The vehicle control method according to an example may further include changing the second visual object to a reference location in a screen displayed on the display, based on an input to one of second buttons different from first buttons for rotating the second visual object among buttons included in the side mirror controller.

The vehicle control method according to an example may further include superimposing and displaying a range where the second visual object is rotatable on the image on the display.

The vehicle control method according to an example may further include identifying an angle between a segment connecting the center of a third periphery facing a second periphery longer than a first periphery with the center of the second periphery among peripheries configuring the obtained image and the second visual object, rotating the second visual object such that the angle corresponds to a maximum value of a specified range, based on that the angle is greater than the specified range, and rotating the second visual object such that the angle corresponds to a minimum value of the specified range, based on that the angle is less than the specified range. The angle may include a positive number in a clockwise direction with respect the segment and includes a negative number in a counterclockwise direction with respect to the segment.

The vehicle control method according to an example may further include identifying an angle between a segment connecting the center of a third periphery facing a second periphery longer than a first periphery with the center of the second periphery among peripheries configuring the obtained image and the second visual object, rotating the other end of the second visual object by a second specified angle, based on that an absolute value of the angle is less than a reference value, and rotating the other end of the second visual object by a third specified angle greater than the second specified angle, based on that the absolute value of the angle is greater than or equal to the reference value.

The vehicle control method according to an example may further include displaying at least one of a top-view image or a round-view image on the display, based on images obtained by means of a plurality of cameras including the camera, and controlling the steering, such that the first visual object and the second visual object are superimposed on each other, based on rotating the other end of the second visual object, while the at least one of the top-view image or the round-view image is displayed.

The vehicle control method according to an example may further include identifying a gesture input to the side mirror controller, rotating the other end of the second visual object in a direction corresponding to a first specified direction, based on identifying a first gesture input including the first specified direction, and changing the second visual object to a reference location in a screen displayed on the display, based on identifying a second gesture input including a second specified direction perpendicular to the first specified direction.

The vehicle control method according to an example may further include superimposing and displaying the first visual object and the second visual object, based on identifying at least one of the coupler or the drawbar, or any combination thereof in the obtained image, when activating the function for assisting with the reverse driving.

The present technology may provide a function for assisting a vehicle connected with a trailer to back up.

Furthermore, the present technology may display a screen in a rear direction of the vehicle on the display for reverse driving of the vehicle connected with the trailer, may match an angle of the trailer in a direction desired by the user under control of the user, and may provide a function for backing up the vehicle in the state where the angle of the trailer is matched.

Furthermore, the present technology may set an angle of the trailer in a direction where the user wants to perform reverse driving, using hardware previously provided in the vehicle without adding new hardware, when the vehicle connected with the trailer backs up and may control the vehicle depending on the set angle.

In addition, various effects ascertained directly or indirectly through the present disclosure may be provided.

Hereinabove, although the present disclosure has been described with reference to examples and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus for controlling a vehicle, the apparatus comprising: a processor; a display; a camera; a side mirror controller configured to control a direction of a side mirror of the vehicle based on an input corresponding to the direction; and a steering controller configured to control steering of the vehicle, wherein the processor is configured to: based on activating an assisted reverse driving of the vehicle, cause the camera to obtain an image of the vehicle being connected with a trailer; display, on the display: the obtained image; a first line object indicating a drawbar, wherein the drawbar extends from the trailer and connects to the vehicle via a coupler; and a second line object associated with steering of the vehicle; based on the input to the side mirror controller, rotate the displayed second line object around one of two endpoints of the second line object, wherein the one of two endpoints and the coupler are superimposed on each other, and wherein the input to the side mirror controller corresponds to the direction; and control, based on the rotated second line object, the steering such that the first line object and the second line object are superimposed on each other.

2. The apparatus of claim 1, wherein the processor is configured to:
   rotate the second line object around the one of two endpoints at a first angle, based on the input to the side mirror controller for a first time period, by a number corresponding to the input; and
   based on a continuous input to the side mirror controller for a second time period that is longer than the first time period, after the second time period and until an end time of the continuous input, rotate the second line object around the one of two endpoints.

3. The apparatus of claim 1, further comprising:
   a switch configured to select one of a plurality of side mirrors including the side mirror,
   wherein the processor is configured to:
      rotate the second line object around the one of two endpoints, based on the input to the side mirror controller, in a state where one of the plurality of side mirrors is not selected by the switch.

4. The apparatus of claim 1, wherein the processor is configured to:
   change the second line object to a reference location displayed on the display, based on an input, for rotating the second line object, to one of buttons of the side mirror controller.

5. The apparatus of claim 1, wherein the processor is configured to:
   display, on the display, by superimposing the obtained image on a range of angles within which the second line object is rotatable.

6. The apparatus of claim 1, wherein the processor is configured to:
   identify an angle between a segment and the second line object, the segment connecting a center of a third periphery of the obtained image and a center of a second periphery of the obtained image, wherein the third periphery faces the second periphery, which is longer than a first periphery of the obtained image;
   rotate the second line object around the one of two endpoints such that the angle corresponds to a maximum value of a range, based on the angle being greater than the range; and
   rotate the second line object around the one of two endpoints such that the angle corresponds to a minimum value of the range, based on the angle being less than the range, and
   wherein the range of the angle includes:
      a positive number in a clockwise direction with respect to the segment; and
      a negative number in a counterclockwise direction with respect to the segment.

7. The apparatus of claim 1, wherein the processor is configured to:
   identify an angle between a segment and the second line object, the segment connecting a center of a third periphery of the obtained image and a center of a second periphery of the obtained image, wherein the third periphery faces the second periphery, which is longer than a first periphery of the obtained image;
   rotate the second line object around the one of two endpoints by a second angle, based on an absolute value of the angle being less than a reference value; and
   rotate the second line object around the one of two endpoints by a third angle greater than the second angle, based on the absolute value of the angle being greater than or equal to the reference value.

8. The apparatus of claim 1, further comprising:
   a plurality of cameras including the camera,
   wherein the processor is configured to:
      display, on the display and based on images obtained by the plurality of cameras, at least one of a top-view image or a round-view image; and
      control the steering such that the first line object and the second line object are superimposed on each other, based on rotating the second line object around the one of two endpoints, while the at least one of the top-view image or the round-view image is displayed.

9. The apparatus of claim 1, wherein the processor is configured to:
   identify a gesture input to the side mirror controller;
   rotate the second line object around the one of two endpoints in a direction corresponding to a first direction, based on identifying a first gesture input including the first direction; and change the second line object to a reference location displayed on the display, based on identifying a second gesture input including a second direction perpendicular to the first direction.

10. The apparatus of claim 1, wherein the processor is configured to:
display by superimposing the first line object and the second line object, based on identifying, in the obtained image, at least one of the coupler, the drawbar, or a combination of the coupler and the drawbar and based on activating the assisted reverse driving of the vehicle.

11. A method performed by a vehicle, the method comprising:
obtaining, via a camera of the vehicle, an image of the vehicle being connected with a trailer, based on activating an assisted reverse driving of the vehicle;
displaying on a display of the vehicle:
the obtained image;
a first line object indicating a drawbar, wherein the drawbar extends from the trailer and connects to the vehicle via a coupler; and
a second line object associated with steering of the vehicle;
based on an input to a side mirror controller for controlling a direction of a side mirror of the vehicle, rotating the displayed second line object around one of two endpoints of the second line object, wherein the one of two endpoints and the coupler are superimposed on each other; and
controlling, based on the rotated second line object, the steering such that the first line object and the second line object are superimposed on each other.

12. The method of claim 11, further comprising:
rotating the second line object around the one of two endpoints at a first angle, based on the input to the side mirror controller for a first time period, by a number corresponding to the input; and
based on a continuous input to the side mirror controller for a second time period that is longer than the first time period, after the second time period and until an end time of the continuous input, rotating the second line object around the one of two endpoints.

13. The method of claim 11, further comprising:
rotating the second line object around the one of two endpoints, based on the input to the side mirror controller, in a state where one of a plurality of side mirrors including the side mirror is not selected.

14. The method of claim 11, further comprising:
changing the second line object to a reference location displayed on the display, based on an input, for rotating the second line object, to one of buttons of the side mirror controller.

15. The method of claim 11, further comprising:
displaying, on the display, the obtained image superimposed on a range of angles within which the second line object is rotatable.

16. The method of claim 11, further comprising:
identifying an angle between a segment and the second line object, the segment connecting a center of a third periphery of the obtained image and a center of a second periphery of the obtained image, wherein the third periphery faces the second periphery, which is longer than a first periphery of the obtained image;
rotating the second line object around the one of two endpoints such that the angle corresponds to:
a maximum value of a range, based on the angle being greater than the range; or
a minimum value of the range, based on the angle being less than the range,
wherein the range of the angle includes:
a positive number in a clockwise direction with respect the segment; and
a negative number in a counterclockwise direction with respect to the segment.

17. The method of claim 11, further comprising:
identifying an angle between a segment and the second line object, the segment connecting a center of a third periphery of the obtained image and a center of a second periphery of the obtained image, wherein the third periphery faces the second periphery, which is longer than a first periphery of the obtained image; and
rotating the second line object around the one of two endpoints by:
a second angle, based on an absolute value of the angle being less than a reference value; or
a third angle greater than the second angle, based on the absolute value of the angle being greater than or equal to the reference value.

18. The method of claim 11, further comprising:
displaying, on the display and based on images obtained by a plurality of cameras, at least one of a top-view image or a round-view image; and
controlling the steering such that the first line object and the second line object are superimposed on each other, based on rotating the second line object around the one of two endpoints, while the at least one of the top-view image or the round-view image is displayed.

19. The method of claim 11, further comprising:
identifying a gesture input to the side mirror controller;
rotating the second line object around the one of two endpoints in a direction corresponding to a first direction, based on identifying a first gesture input including the first direction; and
changing the second line object to a reference location displayed on the display, based on identifying a second gesture input including a second direction perpendicular to the first direction.

20. The method of claim 11, further comprising:
displaying the first line object and the second line object at least partially superimposed on the first line object based on identifying, in the obtained image, at least one of the coupler, the drawbar, or a combination of the coupler and the drawbar and based on activating the assisted reverse driving of the vehicle.

* * * * *